(12) United States Patent
Wong et al.

(10) Patent No.: US 12,333,490 B1
(45) Date of Patent: Jun. 17, 2025

(54) SYSTEM AND METHOD OF PARTITION OVERLOAD HANDLING FOR E-COMMERCE AVAILABLE TO PROMISE INQUIRIES

(71) Applicant: Blue Yonder Group, Inc., Scottsdale, AZ (US)

(72) Inventors: Bernie Wong, Clearwater Beach, FL (US); Balaji Natarajan, Shrewsbury, MA (US); Raghuveer Prasad Nagar, Kota (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 271 days.

(21) Appl. No.: 18/207,930

(22) Filed: Jun. 9, 2023

Related U.S. Application Data

(60) Provisional application No. 63/423,911, filed on Nov. 9, 2022.

(51) Int. Cl.
*G06Q 10/087* (2023.01)
(52) U.S. Cl.
CPC ................. *G06Q 10/087* (2013.01)
(58) Field of Classification Search
CPC .................................................. G06Q 10/087
USPC .......................................................... 705/28
See application file for complete search history.

(56) References Cited

U.S. PATENT DOCUMENTS

| | | | |
|---|---|---|---|
| 6,463,345 B1 * | 10/2002 | Peachey-Kountz | G06Q 10/087 705/28 |
| 8,666,846 B1 * | 3/2014 | Chenault | G06Q 10/087 705/28 |
| 9,444,752 B2 | 9/2016 | Backholm | |
| 2002/0042756 A1 * | 4/2002 | Kumar | G06Q 30/06 705/7.31 |
| 2007/0050069 A1 * | 3/2007 | Treichler | G06Q 10/087 700/99 |
| 2007/0271132 A1 * | 11/2007 | Peachey-Kountz | G06Q 10/06315 705/7.25 |
| 2008/0114667 A1 * | 5/2008 | Esau | G06Q 10/087 705/28 |

(Continued)

FOREIGN PATENT DOCUMENTS

| | | | |
|---|---|---|---|
| CA | 2176530 A1 * | 12/1996 | ........... G06Q 10/087 |
| CN | 103927628 A * | 7/2014 | ............. G06Q 10/06 |

(Continued)

*Primary Examiner* — Russell S Glass
(74) *Attorney, Agent, or Firm* — Spencer Fane LLP; Steven J. Laureanti

(57) ABSTRACT

A system and method are disclosed for handling an available to promise inquiry. The method comprises requesting statistics for partitions of a distributed cache, determining whether a threshold for the partitions has been reached, in response to a determination that the threshold for the partitions has been reached, fetching inventory data for the available to promise inquiry from a local cache, and in response to a determination that the threshold for the partitions has not been reached, fetching inventory data for the available to promise inquiry from the distributed cache. The method further comprises setting an expiry time before the local cache is purged, and storing a status of the partitions based at least in part on the determining that the threshold for the partitions has been reached, the status indicating the partitions as being overloaded.

20 Claims, 4 Drawing Sheets

(56) References Cited

U.S. PATENT DOCUMENTS

| | | | |
|---|---|---|---|
| 2010/0161451 A1* | 6/2010 | Venkatasubramanyan | ................... G06Q 10/087 705/28 |
| 2011/0137708 A1* | 6/2011 | Venkatasubramanyan | ................... G06Q 10/06 705/28 |
| 2015/0016264 A1* | 1/2015 | Backholm | ............... H04W 4/18 370/235 |
| 2016/0155164 A1* | 6/2016 | Ott | ....................... G06Q 10/087 705/26.35 |

FOREIGN PATENT DOCUMENTS

| | | | | |
|---|---|---|---|---|
| EP | 1049038 A2 * | 11/2000 | ........... | G06Q 10/087 |
| EP | 1785919 A1 * | 5/2007 | ........... | G06Q 10/087 |
| WO | WO-0229687 A1 * | 4/2002 | ............. | G06Q 10/06 |

* cited by examiner

SYSTEM AND METHOD OF PARTITION OVERLOAD HANDLING FOR E-COMMERCE AVAILABLE TO PROMISE INQUIRIES

CROSS-REFERENCE TO RELATED APPLICATIONS

The present disclosure is related to that disclosed in the U.S. Provisional Application No. 63/423,911, filed Nov. 9, 2022, entitled "Partition Overload Handling for E-Commerce ATP Inquiries." U.S. Provisional Application No. 63/423,911 is assigned to the assignee of the present application. The present invention hereby claims priority under 35 U.S.C. § 119(e) to U.S. Provisional Application No. 63/423,911.

TECHNICAL FIELD

The present disclosure relates generally to supply chain planning and specifically to determining inventory availability in a supply chain network.

BACKGROUND

When computing inventory availability for supply chain products, an inventory availability service may be used, which may be provided via an application programming interface (API). Inventory availability services may encounter sudden spikes and increased processing traffic for a limited set of items due to retailers utilizing various directed marketing methods for a small set of items and the emergence of shopping bots scraping e-commerce websites for discounts. Existing inventory availability services are not designed for these sudden spikes in traffic for a small set of items. Because of the computation demands of existing inventory availability services, it is not uncommon for these inventory availability services to become unresponsive when faced with traffic spikes, resulting in sluggish website response times, or inaccurate inventory availability information, which may result in a retailer promising to sell inventory it does not actually possess, or losing sales due to marking items as out of stock when they are not. Existing inventory availability services are thus not resilient when faced with sudden traffic spikes, resulting in high-latency communications and inaccurate inventory information, both of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
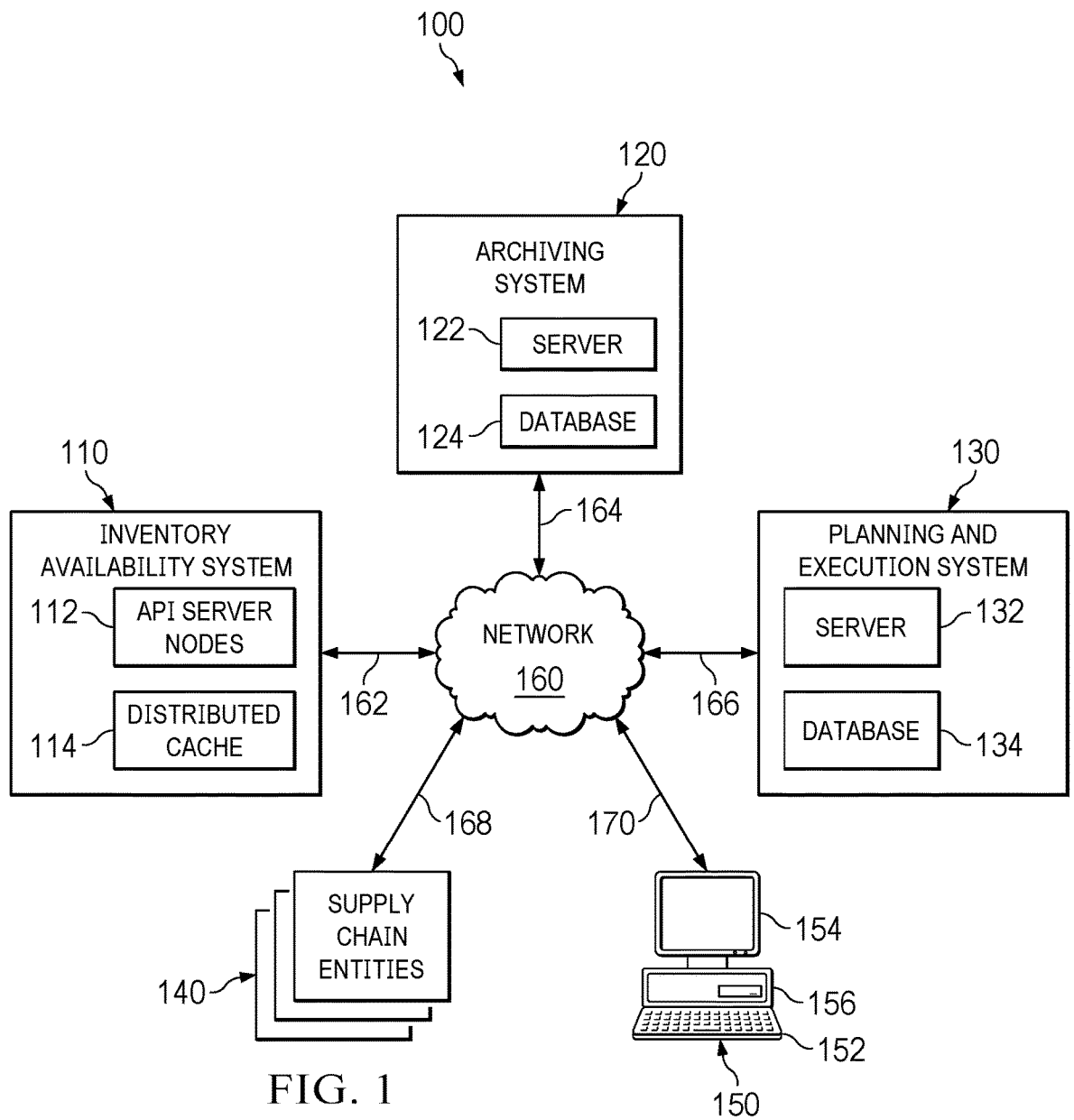
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a system and method for routing inventory availability requests to avoid system overload due to a spike in such requests. Embodiments may perform dynamic histogram-based determinations of hot partitions of a distributed cache and accordingly implement dynamic routing of inventory availability traffic. Embodiments may also move items between local caches to increase resource optimization and avoid issues related to high demand items. Embodiments may use different cache expiry periods for different items based on inventory availability levels.

Embodiments of the following disclosure enable inventory availability systems to be resilient to periods of high request traffic. Use of embodiments may reduce a workload on computing resources during periods of unexpected or undesired spikes in availability requests. Embodiments may enable inventory availability systems to remain in an online state even during periods of extreme traffic spikes. The increased resiliency of embodiments may provide more accurate inventory estimates than existing inventory availability systems due to a higher uptime in such systems.

FIG. 1 illustrates supply chain network 100, in accordance with a first embodiment. Supply chain network 100 comprises inventory availability system 110, archiving system 120, planning and execution system 130, one or more supply chain entities 140, computer 150, network 160, and one or more communication links 162-170. Although a single inventory availability system 110, a single archiving system 120, a single planning and execution system 130, one or more supply chain entities 140, a single computer 150, a single network 160, and one or more communication links 162-170 are shown and described, embodiments contemplate any number of inventory availability systems, archiving systems, planning and execution systems, supply chain entities, computers, networks, or communication links, according to particular needs.

In one embodiment, inventory availability system 110 comprises one or more API server nodes 112 and distributed cache 114. Inventory availability system 110 may compute and expose inventory data 266 (FIG. 2) to respond to available to promise (ATP) requests. As described in more detail below, inventory availability system 110 may, in an embodiment, utilize one or more software modules of API server nodes 112 to track traffic data 204 to one or more partitions 220 of distributed cache 114. Depending on a current status of one or more partitions 220 of distributed cache 114, including data to a particular item that is the subject of an ATP request, inventory availability system 110 may route the traffic of the ATP request to local cache 216 of one or more API server nodes 112.

Archiving system 120 comprises server 122 and database 124. Although archiving system 120 is shown as comprising a single server 122 and a single database 124, embodiments contemplate any suitable number of servers or databases internal to or externally coupled with archiving system 120. Server 122 of archiving system 120 may support one or more processes for receiving and storing data from planning and execution system 130, one or more supply chain entities 140, and/or one or more computers 150 of supply chain network 100. According to some embodiments, archiving system 120 comprises an archive of data received from planning and execution system 130, one or more supply chain entities 140, and/or one or more computers 150 of supply chain network 100. Archiving system 120 provides archived data to inventory availability system 110 and/or planning and execution system 130. Server 122 may store the received data in database 124. Database 124 of archiving system 120 may comprise one or more databases or other data storage arrangements at one or more locations, local to, or remote from, server 122.

According to an embodiment, planning and execution system 130 comprises server 132 and database 134. Supply chain planning and execution is typically performed by several distinct and dissimilar processes, including, for example, assortment planning, demand planning, operations planning, production planning, supply planning, distribution planning, execution, pricing, forecasting, transportation management, warehouse management, inventory management, fulfillment, procurement, and the like. Server 132 of planning and execution system 130 comprises one or more modules, such as, for example, an order capture module, a sourcing module, a scheduling module, and/or a pick-pack-ship module for performing one or more order fulfillment processes. Server 132 stores and retrieves data from database 134 or one or more locations in supply chain network 100. In addition, planning and execution system 130 operates on one or more computers 150 that are integral to or separate from the hardware and/or software that support archiving system 120 and inventory availability system 110.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although one example of supply chain network 100 is illustrated and described, embodiments contemplate any configuration of supply chain network 100, without departing from the scope described herein.

As shown in FIG. 1, supply chain network 100 comprising inventory availability system 110, archiving system 120, planning and execution system 130, and one or more supply chain entities 140 may operate on one or more computers 150 that are integral to or separate from the hardware and/or software that support inventory availability system 110, archiving system 120, planning and execution system 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, CD-ROM, in-memory device, or other suitable media to receive output from and provide input to supply chain network 100.

One or more computers 150 may include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field-programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from inventory availability system 110, archiving system 120, planning and execution system 130, and one or more supply chain entities 140. In addition, each of one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with inventory availability system 110 and archiving system 120.

In one embodiment, inventory availability system 110 may be coupled with network 160 using communication link 162, which may be any wireline, wireless, or other link suitable to support data communications between inventory availability system 110 and network 160 during operation of supply chain network 100. Archiving system 120 may be coupled with network 160 using communication link 164, which may be any wireline, wireless, or other link suitable to support data communications between archiving system 120 and network 160 during operation of supply chain network 100. Planning and execution system 130 may be coupled with network 160 using communication link 166, which may be any wireline, wireless, or other link suitable to support data communications between planning and execution system 130 and network 160 during operation of supply chain network 100. One or more supply chain entities 140 may be coupled with network 160 using communication link 168, which may be any wireline, wireless, or other link suitable to support data communications between one or more supply chain entities 140 and network 160 during operation of supply chain network 100. Computer 150 may be coupled with network 160 using communication link 170, which may be any wireline, wireless, or other link suitable to support data communications between computer 150 and network 160 during operation of supply chain network 100. Although communication links 162-170 are shown as generally coupling inventory availability system 110, archiving system 120, planning and execution system 130, one or more supply chain entities 140, and computer 150 to network 160, any of inventory availability system 110, archiving system 120, planning and execution system 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling inventory availability system 110, archiving system 120, planning and execution system 130, one or more supply chain entities 140, and computer 150. For example, data may be maintained locally to, or externally of, inventory availability system 110, archiving system 120, planning and execution system 130, one or more supply chain entities 140, and computer 150 and made available to one or more associated users of inventory availability system 110, archiving system 120, planning and execution system 130, one or more supply chain entities 140, and computer 150 using network 160 or in any other appropriate manner. For example, data may be maintained in a cloud database at one or more locations external to inventory availability system 110, archiving system 120, planning and execution system 130, one or more supply chain entities 140, and computer 150 and made available to one or more associated users of inventory availability system 110, archiving system 120, planning and execution system 130, one or more supply chain entities 140, and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Figure 2:
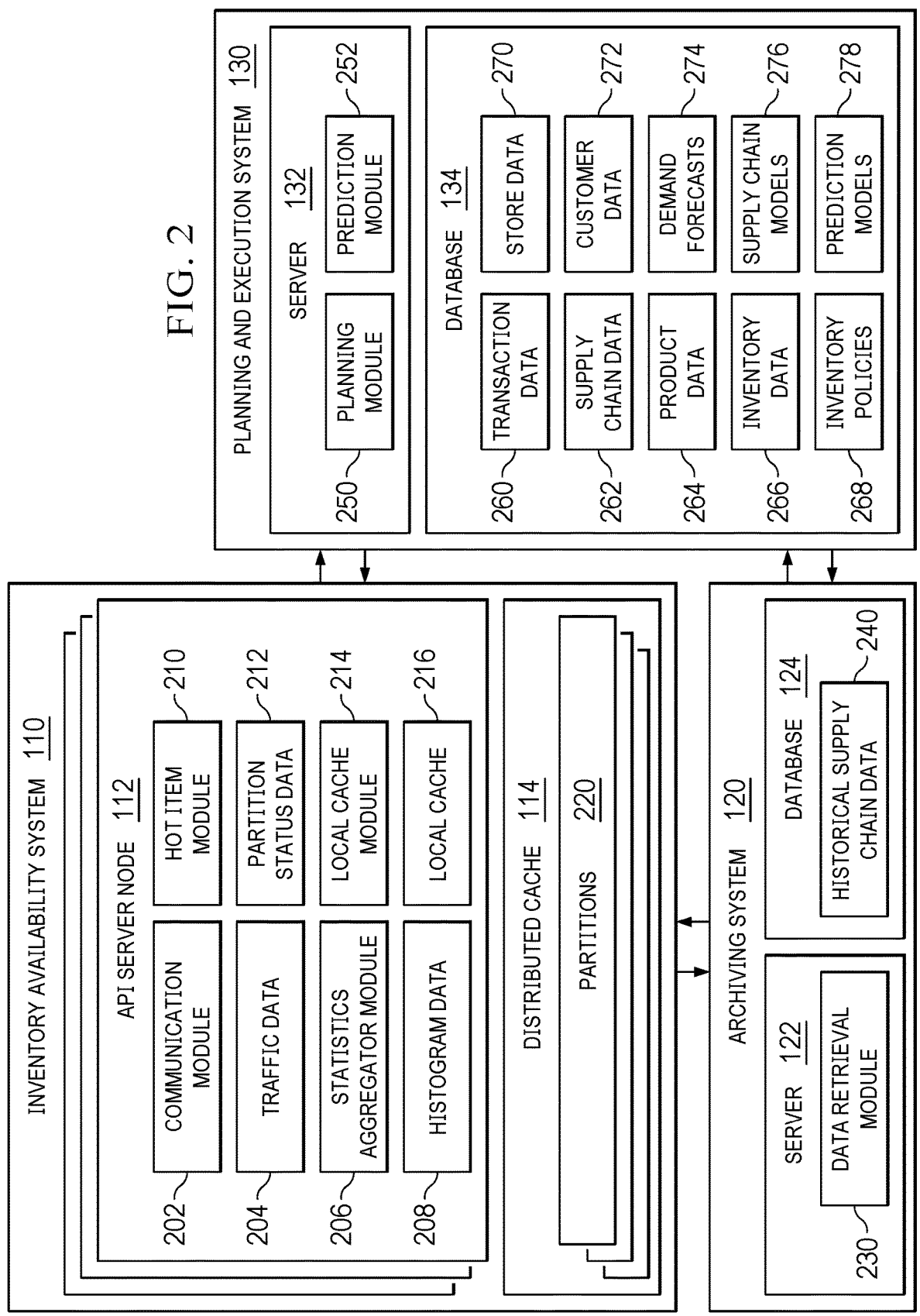
FIG. 2 illustrates the inventory availability system, the archiving system, and the planning and execution system of FIG. 1 in greater detail, in accordance with an embodiment.

FIG. 2 illustrates inventory availability system 110, archiving system 120, and planning and execution system 130 of FIG. 1 in greater detail, in accordance with an embodiment. Inventory availability system 110 may comprise one or more API server nodes 112 and distributed cache 114, as described above. Although inventory availability system 110 is shown as comprising a plurality of API server nodes 112 and a single distributed cache 114, embodiments contemplate any suitable number of servers or databases internal to or externally coupled with inventory availability system 110.

API server node 112 is a node in a distributed computing system, such as a virtual machine (VM), which may be used to perform tasks of inventory availability system 110. Although in this example multiple API server nodes 112 are shown within inventory availability system 110, API server nodes 112 may be distributed across multiple physical machines. API server nodes 112 may comprise allocated computing resources, such as, for example, processing time, RAM, database storage, or the like from a physical computing device. According to embodiments, API server nodes 112 may execute independently from other API server nodes 112, regardless of whether API server nodes 112 are allocated computing resources on the same physical computing device. In embodiments, a load balancer, such as load balancer 404 (FIG. 4), may centrally control API server nodes 112 via a hypervisor layer or other control mechanism to distribute traffic to API server nodes 112 and allocate computing resources to API server nodes 112.

API server node 112 of inventory availability system 110 comprises communication module 202, traffic data 204, statistics aggregator module 206, histogram data 208, hot item module 210, partition status data 212, local cache module 214, and local cache 216. Although API server node 112 is shown and described as comprising a single communication module 202, traffic data 204, a single statistics aggregator module 206, histogram data 208, a single hot item module 210, partition status data 212, a single local cache module 214, and a single local cache 216, embodiments contemplate any suitable number or combination of these located at one or more locations, local to, or remote from inventory availability system 110, such as on multiple servers or computers 150 at one or more locations in supply chain network 100.

Distributed cache 114 of inventory availability system 110 may comprise one or more databases or other data storage arrangements at one or more locations, local to, or remote from, API server nodes 112. Distributed cache 114 is used by API server nodes 112 to obtain inventory data 266, which may be computed by one or more of API server nodes 112 or received from planning and execution system 130 and stored in distributed cache 114 to allow wider access to computed inventory data 266. Distributed cache 114 comprises, for example, one or more partitions 220, which separate inventory data 266 stored by distributed cache 114. In general, when API server node 112 attempts to access inventory information about an item of supply chain network 100, the request is routed to a partition of distributed cache 114 associated with that item. Although distributed cache 114 is shown and described as comprising partitions 220, embodiments contemplate any suitable number or combination of data, located at one or more locations, local to, or remote from, inventory availability system 110, according to particular needs.

Communication module 202 receives inventory information requests, such as, for example, ATP requests from other devices within supply chain network 100 and, once the inventory information has been retrieved, responds to the requests. For example, communication module 202 may receive inventory information requests from an e-commerce web server to determine the inventory availability of items for sale on the e-commerce websites. According to embodiments, communication module 202 retrieves the inventory information from local cache module 214. Communication module 202 may raise an internal event, which may comprise a number of calls for an item subject to an ATP request.

Traffic data 204 comprises partition-wise traffic data related to the access rates of partitions 220 of distributed cache 114. API server node 112 tracks the frequency that each individual partition of partitions 220 is accessed. Sudden increases to the rate of information availability requests to a single partition may indicate that a particular item stored within that partition may be the subject of a sudden increase in demand, which may be the result of a sale, targeting marketing, social media promotions, activity of shopping bots, or other factors.

Statistics aggregator module 206 uses traffic data 204 to prepare histograms indicating request rates for partitions 220. According to embodiments, statistics aggregator module 206 comprises a histogram builder which creates histograms over a time interval I. For example, statistics aggregator module 206 may run at an interval of I seconds within each API server node 112 and create histograms out of all partition-wise traffic data 204 pooled in that interval. In embodiments, interval I may be kept low to minimize the risk of a request rate spike occurring completely within interval I. Statistics aggregator module 206 saves the histograms generated as histogram data 208.

Hot item module 210 determines whether one or more partitions of partitions 220 is in an overload state, which may also be referred to as the "Sizzling Hot Item" (SHI) state. According to embodiments, hot item module 210 uses histogram data 208 to determine whether a hot item threshold has been reached. In some embodiments, the hot item threshold may be reached when the percentile of hits for a small number of partitions 220 exceeds a threshold (such as, for example, n partitions account for P percentile, where n and P are initially determined empirically based on what the cluster is able to process). Hot item module 210 may use any appropriate algorithm, such as percentiles, regression, trends, anomaly detection, and the like to detect traffic to one or more items. In addition, or as an alternative, hot item module 210 may use standard deviation or another statistical value to determine whether the hot item threshold has been reached. For example, when each partition has one transaction per second (TPS) per API node server 112, with a standard deviation of 25% for the hottest partition of partitions 220, hot item module 210 may detect a partition overload scenario when the standard deviation of the hottest partition from the non-overloaded mean is 10× or 20×. In other embodiments, the hot item threshold may be reached when the total TPS is greater than a threshold T that is set, which may prevent this mechanism from being activated at low volumes. When hot item module 210 determines that the hot item threshold has been reached for a partition of partitions 220, hot item module 210 marks that partition as "overloaded" or as "SHI." Hot item module 210 saves the status of partitions 220 (normal load or SHI) as partition status data 212.

Local cache module 214 synchronously checks the partition ID of each of the item IDs that API node server 112 is requested to fetch. When one or more partitions 220 is in SHI state as indicated by partition status data 212, then local cache module 214 switches to fetching data from local cache 216 as opposed to fetching from distributed cache 114. That is, on detecting a partition as SHI, traffic is automatically adjusted to have dynamic routing to local cache 216. In embodiments, local cache module 214 also manages local cache 216, such as by setting an expiry time before local cache 216 is purged and traffic rerouted to distributed cache 114. When the distribution of calls into API server node 112 that is under an SHI scenario returns to a regular rate, API server node 112 reverts to the regular state and stops inspecting the partition ID of every incoming item.

According to embodiments, local cache 216 is a temporal cache created by local cache module 214 to redirect traffic from an overloaded partition of partitions 220. In some cases of extreme request spikes, local cache 216 may become overloaded within the set expiry period of local cache 216. In such cases, local cache module 214 may generate an additional local cache 216 or redirect traffic of local cache 216 of a different API server node 112, depending on particular need. When initializing local cache 216, local cache module 214 may fetch inventory data 266 from distributed cache 114 and store the data of the SHI partition in local cache 216, allowing the SHI partition to be temporarily accessed directly from API server node 112 rather than from distributed cache 114.

As discussed above, archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 230. Although server 122 is shown and described as comprising a single data retrieval module 230, embodiments contemplate any suitable number or combination of data retrieval modules located at one or more locations, local to, or remote from archiving system 120, such as on multiple servers or computers 150 at one or more locations in supply chain network 100.

In one embodiment, data retrieval module 230 of archiving system 120 receives historical supply chain data 240 from planning and execution system 130 and one or more supply chain entities 140 and stores received historical supply chain data 240 in archiving system 120 database 124. According to one embodiment, data retrieval module 230 of archiving system 120 may prepare historical supply chain data 240 for use as the training data of inventory availability system 110 by checking historical supply chain data 240 for errors and transforming historical supply chain data 240 to normalize, aggregate, and/or rescale historical supply chain data 240 to allow direct comparison of data received from different planning and execution systems 130, one or more supply chain entities 140, and/or one or more other locations local to, or remote from, archiving system 120. According to embodiments, data retrieval module 230 may receive data from one or more sources external to supply chain network 100, such as, for example, weather data, special events data, social media data, calendar data, and the like and stores the received data as historical supply chain data 240.

Database 124 of archiving system 120 may comprise one or more databases or other data storage arrangements at one or more locations, local to, or remote from, server 122. Database 124 of archiving system 120 comprises, for example, historical supply chain data 240. Although database 124 of archiving system 120 is shown and described as comprising historical supply chain data 240, embodiments contemplate any suitable number or combination of data, located at one or more locations, local to, or remote from, archiving system 120, according to particular needs.

Historical supply chain data 240 comprises historical data received from inventory availability system 110, archiving system 120, supply chain planning and execution system 130, one or more supply chain entities 140, and/or computer 150. Historical supply chain data 240 may comprise, for example, weather data, special events data, social media data, calendar data, and the like. In an embodiment, historical supply chain data 240 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As discussed above, planning and execution system 130 comprises server 132 and database 134. Although planning and execution system 130 is shown as comprising a single server 132 and a single database 134, embodiments contemplate any suitable number of servers or databases internal to or externally coupled with planning and execution system 130.

Server 132 of planning and execution system 130 comprises planning module 250 and prediction module 252. Although server 132 is shown and described as comprising a single planning module 250 and a single prediction module 252, embodiments contemplate any suitable number or combination of planning modules and prediction modules located at one or more locations, local to, or remote from planning and execution system 130, such as on multiple servers or computers 150 at one or more locations in supply chain network 100.

Database 134 of planning and execution system 130 may comprise one or more databases or other data storage arrangements at one or more locations, local to, or remote from, server 132. Database 134 of planning and execution system 130 comprises, for example, transaction data 260, supply chain data 262, product data 264, inventory data 266, inventory policies 268, store data 270, customer data 272, demand forecasts 274, supply chain models 276, and prediction models 278. Although database 134 of planning and execution system 130 is shown and described as comprising transaction data 260, supply chain data 262, product data 264, inventory data 266, inventory policies 268, store data 270, customer data 272, demand forecasts 274, supply chain models 276, and prediction models 278, embodiments contemplate any suitable number or combination of data, located at one or more locations, local to, or remote from, planning and execution system 130, according to particular needs.

Planning module 250 of planning and execution system 130 works in connection with prediction module 252 to generate a plan based on one or more predicted retail volumes, classifications, or other predictions. By way of example and not of limitation, planning module 250 may comprise a demand planner that generates demand forecasts 274 for one or more supply chain entities 140. Planning module 250 may generate demand forecasts 274, at least in part, from predictions and calculated factor values for one or more causal factors received from prediction module 252. By way of a further example, planning module 250 may comprise an assortment planner and/or a segmentation planner that generates product assortments that match causal effects calculated for one or more customers or products by prediction module 252, which may provide for increased customer satisfaction and sales, as well as reducing costs for shipping and stocking products at stores where they are unlikely to sell.

Prediction module 252 of planning and execution system 130 applies samples of transaction data 260, supply chain data 262, product data 264, inventory data 266, store data 270, customer data 272, demand forecasts 274, and other data to prediction models 278 to generate predictions and calculated factor values for one or more causal factors. As disclosed above, prediction module 252 of planning and execution system 130 predicts a volume Y (target) from a set of causal factors X along with causal factors strengths that describe the strength of each causal factor variable contributing to the predicted volume. According to some embodiments, prediction module 252 generates predictions at daily intervals. However, embodiments contemplate longer and shorter prediction phases that may be performed, for example, weekly, twice a week, twice a day, hourly, or the like.

Transaction data 260 of planning and execution system 130 database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 260 is represented by any suitable combination of values and dimensions, aggregated or un-aggregated, such as, for example, sales per week, sales per week per location, sales per day, sales per day per season, or the like.

Supply chain data 262 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 264 of database 134 may comprise products identified by, for example, a product identifier (such as a Stock Keeping Unit (SKU), Universal Product Code (UPC), or the like), and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 266 of database 134 may comprise any data relating to current or projected inventory quantities or states, order rules, or the like. For example, inventory data 266 may comprise the current level of inventory for each item at one or more stocking points across supply chain network 100. In addition, inventory data 266 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 266 in database 134, which may be used by planning and execution system 130 to place orders, set inventory levels at one or more stocking points, initiate manufacturing of one or more components, or the like in response to, and based at least in part on, a forecasted demand of planning and execution system 130.

Inventory policies 268 of database 134 may comprise any suitable inventory policy describing the reorder point and target quantity, or other inventory policy parameters that set rules for inventory availability system 110 and/or planning and execution system 130 to manage and reorder inventory. Inventory policies 268 may be based on target service level, demand, cost, fill rate, or the like. According to embodiments, inventory policies 268 comprise target service levels that ensure that a service level of one or more supply chain entities 140 is met with a set probability. For example, one or more supply chain entities 140 may set a service level at 95%, meaning one or more supply chain entities 140 sets the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, inventory availability system 110 and/or the planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s,S) inventory policy. Other inventory policies 268 may be used for perishable goods, such as fruit, vegetables, dairy, fresh meat, as well as electronics, fashion, and similar items for which demand drops significantly after a next generation of electronic devices or a new season of fashion is released.

Store data 270 may comprise data describing the stores of one or more retailers and related store information. Store data 270 may comprise, for example, a store ID, store description, store location details, store location climate, store type, store opening date, lifestyle, store area (expressed in, for example, square feet, square meters, or other suitable measurement), latitude, longitude, and other similar data.

Customer data 272 may comprise customer identity information, including, for example, customer relationship management data, loyalty programs, and mappings between product purchases and one or more customers so that a customer associated with a transaction may be identified. Customer data 272 may comprise data relating customer purchases to one or more products, geographical regions, store locations, or other types of dimensions.

Demand forecasts 274 of database 134 may indicate future expected demand based on, for example, any data relating to past sales, past demand, purchase data, promotions, events, or the like of one or more supply chain entities 140. Demand forecasts 274 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According to other embodiments, the model also takes into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. When each location of this exemplary supermarket is open every day of the year, planning and execution system 130 comprising a demand planner needs to calculate approximately $2 \times 10^{10}$ demand forecasts 274 each day to derive the optimal order volume for the next delivery cycle (e.g. three days).

Supply chain models 276 of database 134 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 276 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Prediction models 278 comprise one or more of the trained models used by planning and execution system 130 for predicting, among other variables, pricing, targeting, or retail volume, such as, for example, a forecasted demand volume for one or more products at one or more stores of one or more retailers based on the prices of the one or more products.

Figure 3:
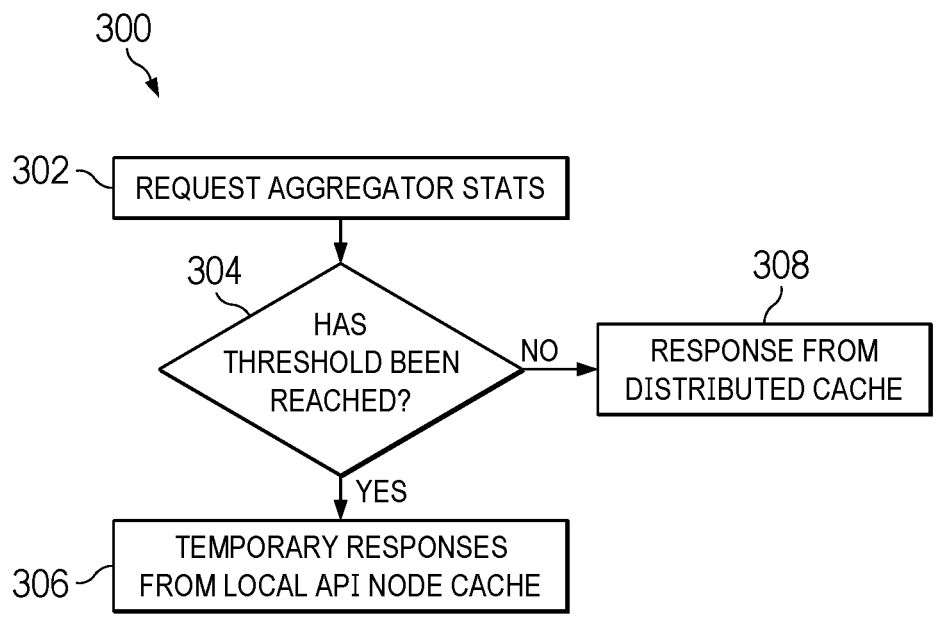
FIG. 3 illustrates a method for routing inventory availability queries, in accordance with an embodiment.

FIG. 3 illustrates method 300 for routing inventory availability queries, in accordance with an embodiment. Method 300 may be performed by an inventory availability system, such as inventory availability system 110 of FIG. 1. Method 300 proceeds by one or more activities, which although described in a particular order may be performed in one or more permutations, combinations, orders, or repetitions, according to particular needs.

At activity 302, hot item module 210 of inventory availability system 110 requests aggregated statistics for partitions 220 of distributed cache 114. In an embodiment, the aggregated statistics may comprise one or more histograms for traffic data 204 of one or more partitions 220. Hot item module 210 may track the number of hits per partition within API server node 112 and may use an event-and-aggregator method to conditionally change the state of a partition to be the SHI state.

At activity 304, hot item module 210 determines whether a hot item threshold for one or more partitions 220 has been reached by analyzing the aggregated statistics. In an embodiment, the hot item threshold may be based on the standard deviation of the aggregated statistics, as discussed in further detail below. When the hot item threshold has been reached, at activity 306 local cache module 214 of inventory availability system 110 fetches inventory data 266 for items of partition 220 that have crossed the hot item threshold from local cache 216 of API server node 112. When the hot item threshold has not been reached, at activity 308 local cache module 214 fetches inventory data 266 from distributed cache 114.

Figure 4:
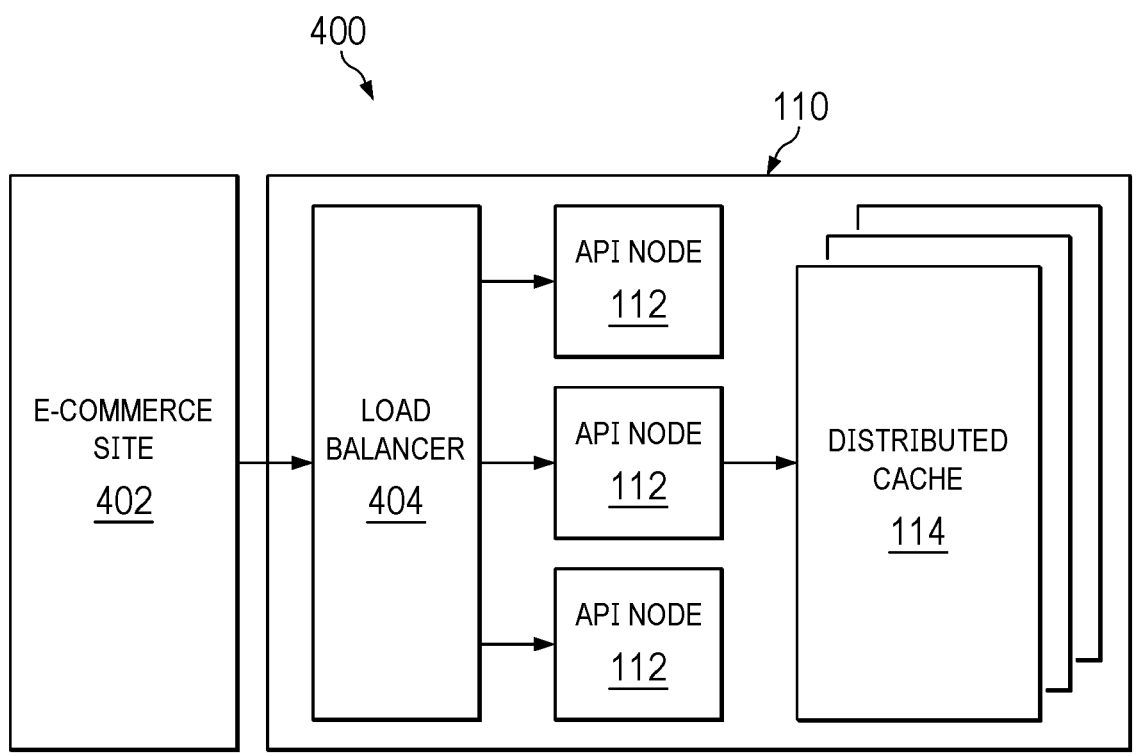
FIG. 4 illustrates an architecture diagram of the inventory availability system of FIG. 1, in accordance with an embodiment.

FIG. 4 illustrates architecture diagram 400 of inventory availability system 110 of FIG. 1, in accordance with an embodiment. Architecture diagram 400 shows e-commerce website 402 and inventory availability system 110. Inventory availability system 110 comprises load balancer 404, one or more API server nodes 112 (in this case, three), and distributed cache 114. Load balancer 404 balances a traffic load among API server nodes 112 to prevent any one API server node 112 from becoming overloaded. In an embodiment, API server nodes 112 are compute nodes comprising business logic to compute inventory availability data. API server nodes 112 fetch inventory data 266 from distributed cache 114.

According to embodiments, traffic from e-commerce website 402 may be sent to inventory availability system 110. For example, e-commerce website 402 may transmit an inventory availability request when an item page is loaded, when a customer adds the item to a shopping cart, or when similar actions are performed. The inventory availability request is processed by inventory availability system 110 by sending the request to one of API server nodes 112 via load balancer 404. Then, as discussed in more detail below, inventory availability system 110 retrieves inventory data 266 to fulfill the inventory availability request from distributed cache 114 or, when the partition of distributed cache 114 associated with the item is in an overloaded or SHI state, from local cache 216 of API server nodes 112.

Figure 5:
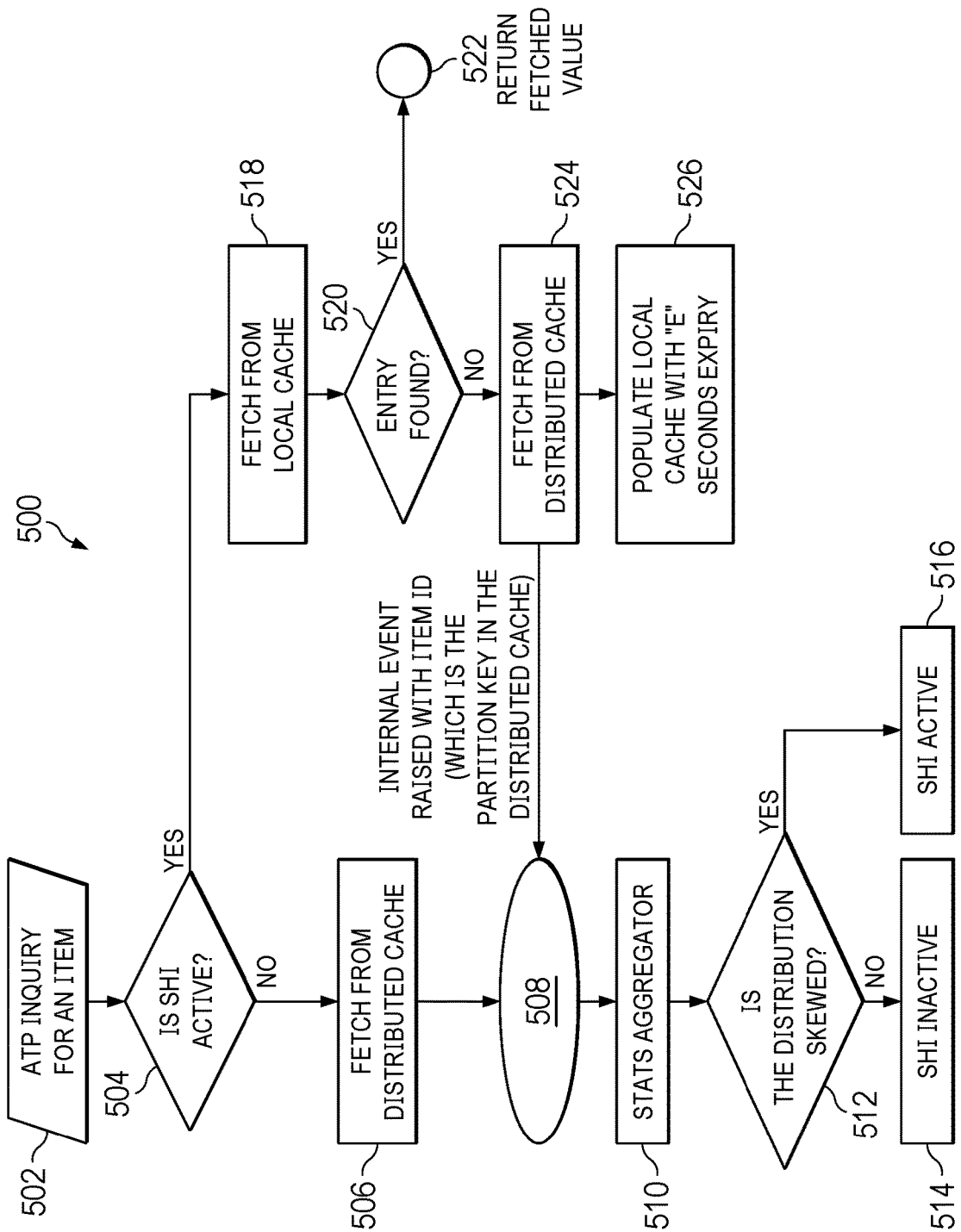
FIG. 5 illustrates a method for handling partition overload in e-commerce available to promise inquiries, in accordance with an embodiment.

FIG. 5 illustrates method 500 for handling partition overload in e-commerce ATP inquiries, in accordance with an embodiment. Method 500 may be performed by an inventory availability system, such as inventory availability system 110 of FIG. 1. Method 500 proceeds by one or more activities, which although described in a particular order may be performed in one or more permutations, combinations, orders, or repetitions, according to particular needs.

At activity 502, communication module 202 of inventory availability system 110 receives an ATP inquiry (or request) for an item of supply chain network 100. According to embodiments, communication module 202 may receive the ATP inquiry from an e-commerce website at one or more API server nodes 112 of inventory availability system 110, as disclosed above.

At activity 504, communication module 202 checks whether the item ID associated with the item is included in one or more partitions 220 of distributed cache 114 that are currently marked as SHI. When the partition in which the item ID is included is marked as normal load, local cache module 214 fetches inventory data 266 for the item from distributed cache 114 at activity 506. At activity 508, communication module 202 raises an internal event with the item ID, which is the partition key in distributed cache 114. According to embodiments, the internal event corresponds to the number of calls associated with the item ID. At activity 510, statistics aggregator module 206 of inventory availability system 110 caches the event raised at activity 508 and generates and/or updates a histogram for the partition to determine whether the partition access rate is increasing or decreasing.

At activity 512, hot item module 210 of inventory availability system 110 determines whether the distribution of the histogram associated with the partition is skewed, that is, whether the access rates for the partition has exceeded a hot item threshold. When hot item module 210 determines the access rate for the partition is not above the hot item threshold, at activity 514 hot item module 210 marks the partition as a normal load. When hot item module 210 determines the access rate for the partition is above the hot item threshold, at activity 516 hot item module 210 marks the partition as SHI.

Returning to activity 504, when the partition is marked as SHI, at activity 518 local cache module 214 attempts to fetch the inventory availability data for the item from local cache 216 of API server node 112. At activity 520, local cache module 214 determines whether an entry for the item is in local cache 216. For example, when the ATP inquiry is the first inquiry for the item since the partition has been marked as SHI, inventory data 266 for the item would not have been populated to local cache 216 yet. For instance, when there are fifty inquiries per second for a particular item within API server node 112, the first inquiry goes to distributed cache 114 and the remaining forty-nine retrieves the data from local cache 216. When the entry for the item is within local cache 216, local cache module 214 returns the fetched value in response to the ATP inquiry at activity 522.

When the entry for the item is not within local cache 216, at activity 524 local cache module 214 fetches inventory data 266 instead from distributed cache 114. At activity 526, local cache module 214 populates inventory data 266 for the item into local cache 216 with an expiry of E seconds. E is computed to be a number such that the number of inquiries going to the SHI partition falls within a partition overload tolerance limit defined as P. That is, E may be dynamically extended to use local cache 216 for a longer period when the load is extremely high rather than a static interval. The duration of E may be computed such that the number of calls going to a SHI partition never exceeds normal load. In addition, or as an alternative, E may be a range. For example, the range may be from EL to EH, where EH is the value used for items with high volumes of ATP requests, EL is the value used for items which are below safety level, with a a value EX between EL and EH that is used for items with intermediate volumes of ATP requests. Local cache module 214 may determine the EXvalue based, at least in part, on the ATP level. That is, the expiry period for items in SHI partitions with high availability may have higher EXvalues. Although local cache 216 contains a stale value for a period of E seconds, this safety valve ensures that distributed cache 114 does not get overwhelmed, safeguarding the entire cluster and overall system.

Inventory availability system 110 may define the cache expiry period E on a per-item basis. Existing inventory data systems do not handle item-level data because supply chain catalogs typically have millions of items, which makes computing item-level data computationally demanding. However, in embodiments inventory availability system 110 defines different cache expiry periods for different items by tracking traffic data for partitions of the items rather than the entire catalog.

Additionally, after activity 524, inventory availability system 110 proceeds to activity 508, raising an internal event indicating access to the partition, and continues with method 500 to compute the histogram at activity 510 and determines whether the access rate has exceeded the hot item thresholds for the partition at activity 512. Inventory availability system 110 also supports an automatic emergency brake, such as, for example, by applying the brake when P exceeds a threshold on "too many inquiries." In addition, or as an alternative, inventory availability system 110 may apply the emergency brake functionality on approval from an authorized user. For example, a user may issue a command in response to a notification from inventory availability system 110 that the traffic load is too high for inventory availability system 110 to reroute. When the emergency brake functionality is activated, the item is listed as out-of-stock in both local cache 216 and distributed cache 114, even when an availability calculation determines otherwise, until the item gets removed from SHI status.

Inventory availability system 110 may use various threshold values in embodiments as discussed in further detail above, including but not limited to the histogram period I, an anomaly detection threshold, the cache expiry period E, and/or a local cache overwhelm threshold. According to embodiments, inventory availability system 110 may automatically update the threshold values using reinforcement learning. By way of example only and not by way of limitation, when inventory availability system 110 initially uses one hundred milliseconds as the value for E and local cache 216 is recreated shortly after expiry after several iterations of using the same E value, inventory availability system 110 may determine that one hundred milliseconds is too short. In this example, inventory availability system 110 may increase the E value using one or more reinforcement learning models.

Inventory availability system 110 may utilize a combination of separating the traffic by pre-determined high traffic scenarios into a "read system," as well as a partition overload defense algorithm, such as method 500 described above. The partition overload defense algorithm uses an API-server-node-level cache to store pre-computed ATP values for extremely high traffic items. The partition overload defense algorithm provides an additional layer of defense to protect distributed cache 114. In addition, or as an alternative, inventory availability system 110 may use traditional bot attack perimeter defense as well as a read system that caches pre-computed ATP values for a limited pattern of predictable high traffic items.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for handling an available to promise inquiry, comprising:
   requesting, by a computer comprising a processor and memory, statistics for one or more partitions of a distributed cache;
   determining, by the computer, whether a threshold for the one or more partitions has been reached;
   in response to a determination that the threshold for the one or more partitions has been reached, fetching, by the computer, inventory data for the available to promise inquiry from a local cache; and
   in response to a determination that the threshold for the one or more partitions has not been reached, fetching, by the computer, inventory data for the available to promise inquiry from the distributed cache.

2. The computer-implemented method of claim 1, further comprising:
   setting, by the computer, an expiry time before the local cache is purged.

3. The computer-implemented method of claim 1, wherein the determining that the threshold for the one or more partitions has been reached is based on a standard deviation.

4. The computer-implemented method of claim 1, wherein the determining that the threshold for the one or more partitions has been reached is based on determining that a percentile of hits for a number of partitions of the one or more partitions exceeds the threshold.

5. The computer-implemented method of claim 1, wherein the threshold is based on one or more histograms each indicating a request rate.

6. The computer-implemented method of claim 5, wherein the one or more histograms are created over a time interval.

7. The computer-implemented method of claim 1, further comprising:
   storing, by the computer, a status of the one or more partitions based at least in part on the determining that the threshold for the one or more partitions has been reached, the status indicating the one or more partitions as being overloaded.

8. A system for handling an available to promise inquiry, comprising:
   a computer, comprising a processor and memory, the computer configured to:
      request statistics for one or more partitions of a distributed cache;
      determine whether a threshold for the one or more partitions has been reached;
      in response to a determination that the threshold for the one or more partitions has been reached, fetch inventory data for the available to promise inquiry from a local cache; and
      in response to a determination that the threshold for the one or more partitions has not been reached, fetch inventory data for the available to promise inquiry from the distributed cache.

9. The system of claim 8, wherein the computer is further configured to:
   set an expiry time before the local cache is purged.

10. The system of claim 8, wherein the determining that the threshold for the one or more partitions has been reached is based on a standard deviation.

11. The system of claim 8, wherein the determining that the threshold for the one or more partitions has been reached is based on determining that a percentile of hits for a number of partitions of the one or more partitions exceeds the threshold.

12. The system of claim 8, wherein the threshold is based on one or more histograms each indicating a request rate.

13. The system of claim 12, wherein the one or more histograms are created over a time interval.

14. The system of claim 13, wherein the computer is further configured to:
   store a status of the one or more partitions based at least in part on the determining that the threshold for the one or more partitions has been reached, the status indicating the one or more partitions as being overloaded.

15. A non-transitory computer-readable medium embodied with software for handling an available to promise inquiry, the software when executed:
   requests statistics for one or more partitions of a distributed cache;
   determines whether a threshold for the one or more partitions has been reached;
   in response to a determination that the threshold for the one or more partitions has been reached, fetches inventory data for the available to promise inquiry from a local cache; and
   in response to a determination that the threshold for the one or more partitions has not been reached, fetches inventory data for the available to promise inquiry from the distributed cache.

16. The non-transitory computer-readable medium of claim 15, wherein the software when executed further:
   sets an expiry time before the local cache is purged.

17. The non-transitory computer-readable medium of claim 15, wherein the determining that the threshold for the one or more partitions has been reached is based on a standard deviation.

18. The non-transitory computer-readable medium of claim 15, wherein the determining that the threshold for the one or more partitions has been reached is based on determining that a percentile of hits for a number of partitions of the one or more partitions exceeds the threshold.

19. The non-transitory computer-readable medium of claim 15, wherein the threshold is based on one or more histograms each indicating a request rate.

20. The non-transitory computer-readable medium of claim 19, wherein the one or more histograms are created over a time interval.

\* \* \* \* \*